June 13, 1950  
E. F. ANDREWS  
ROTOR BLADE LIFT CONTROL FOR ROTARY WING SUSTAINED AIRCRAFT  
2,511,687
Filed Dec. 29, 1941  
3 Sheets-Sheet 1
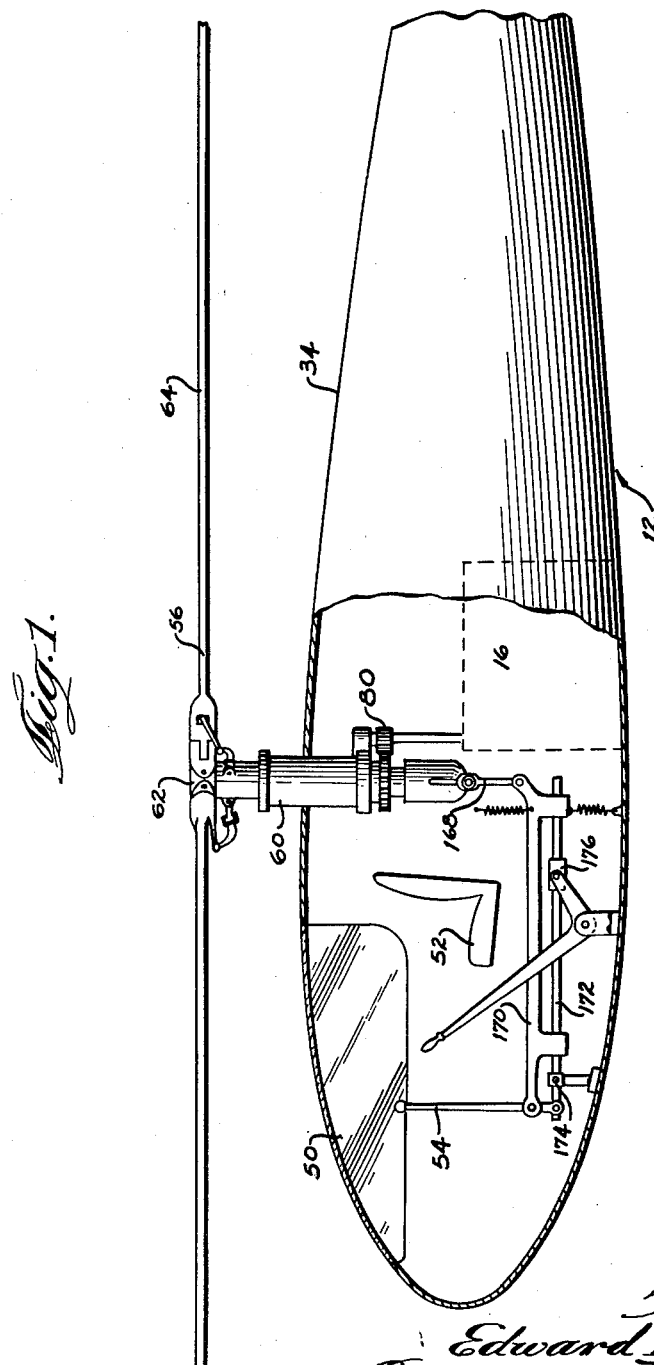
Inventor:
Edward F. Andrews
By C. A. Norton
Attorney

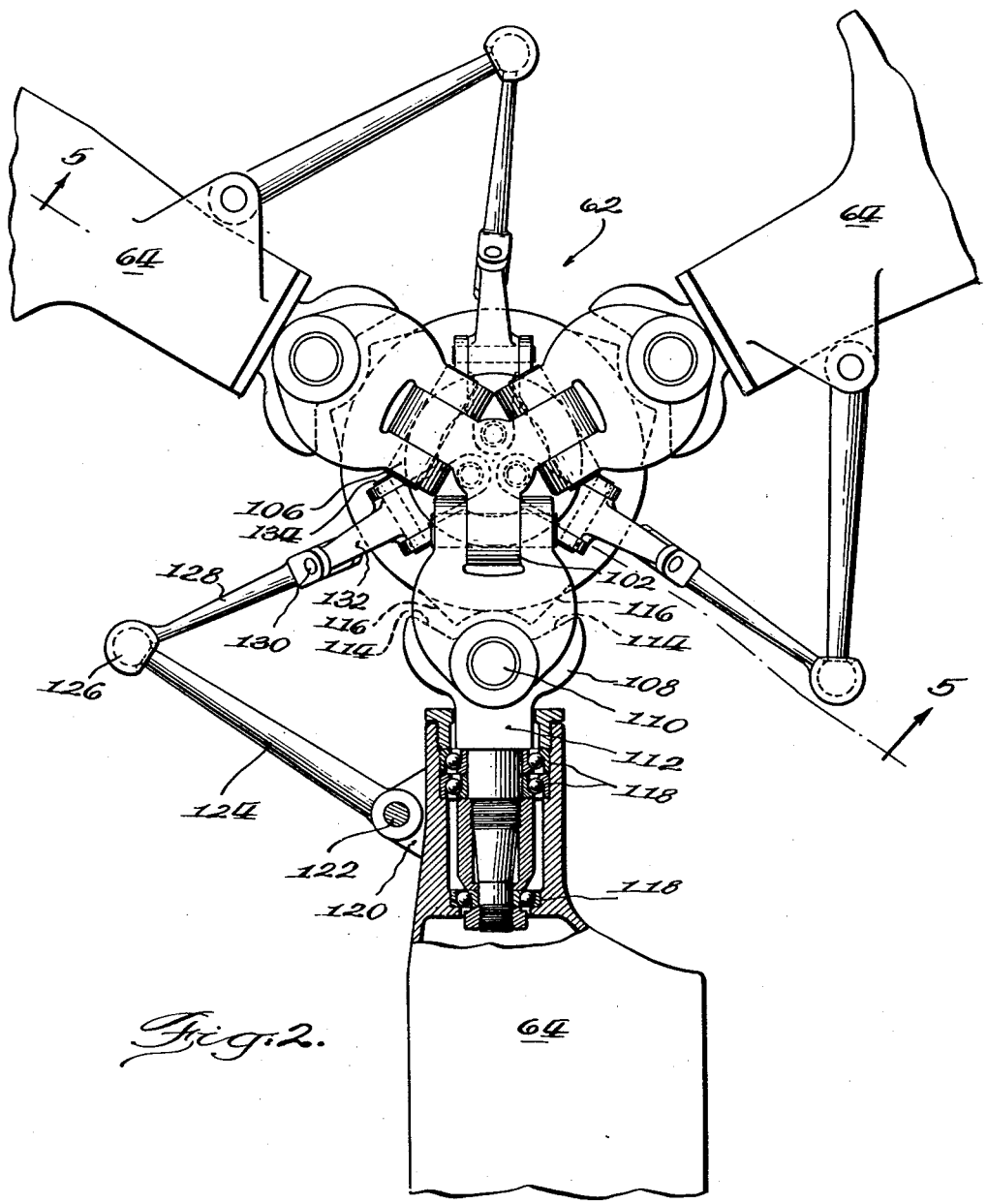

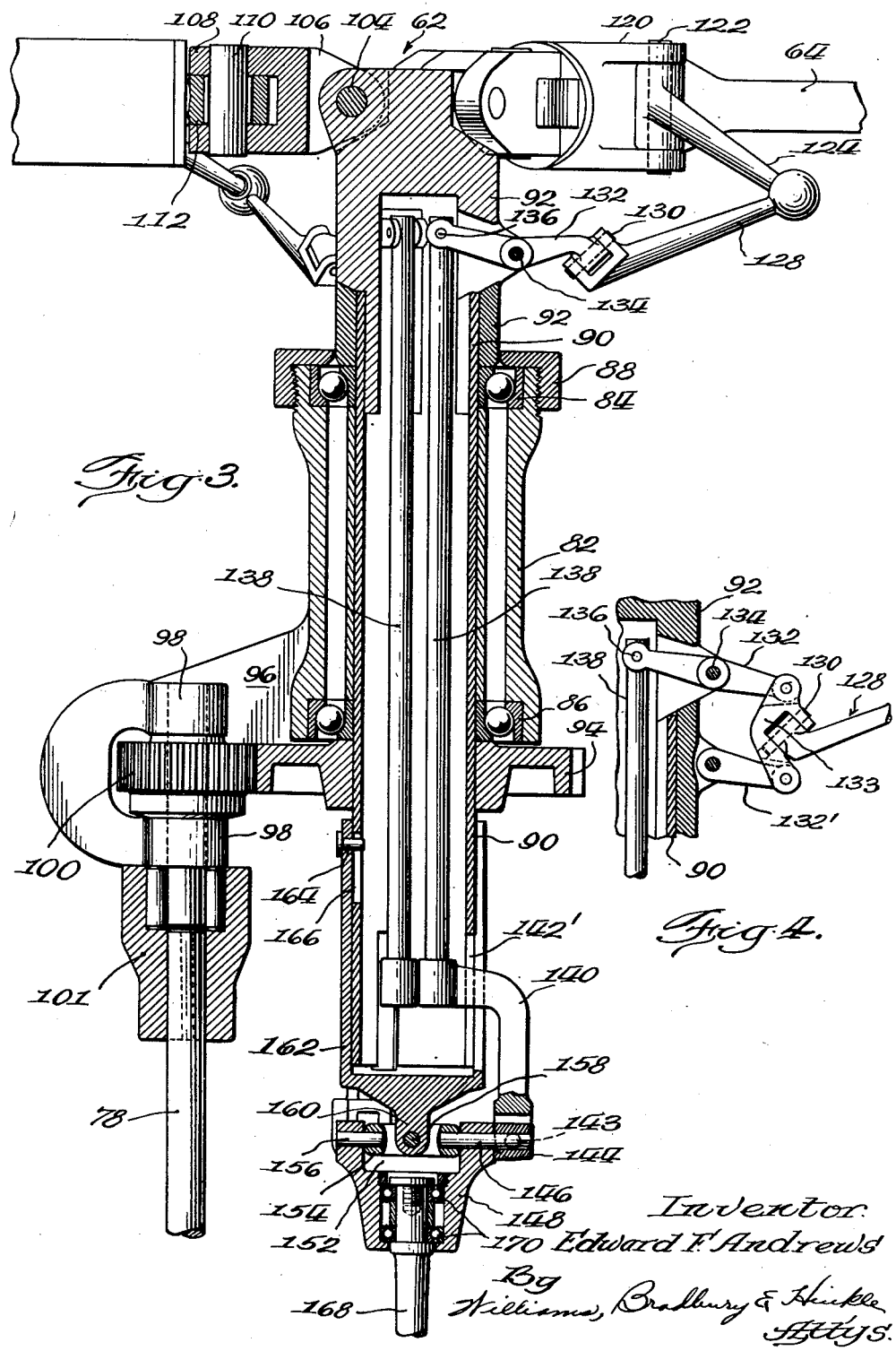

Patented June 13, 1950

2,511,687

UNITED STATES PATENT OFFICE 2,511,687

ROTOR BLADE LIFT CONTROL FOR ROTARY WING SUSTAINED AIRCRAFT

Edward F. Andrews, Chicago, Ill.

Application December 29, 1941, Serial No. 424,756

19 Claims. (Cl. 170—160.25)

1

This invention relates to rotating wing aircraft, and is more particularly concerned with the central supporting and control structure of one or more sustaining rotors providing sustention during the flight of the aircraft or only during certain phases of flight. The invention is applicable to rotating wings rotated by aerodynamic forces or to helicopters in which one or more rotors are power driven. The invention provides controllable means for providing cyclical variation of rotor blade lift, and also for increasing or decreasing the lift of the rotor as a whole, throughout its rotative cycle. The invention also provides means by which control forces may be transmitted to one or more rotor blades through a central shaft of relatively small diameter, rotatably supported in bearings which may also be of relatively small diameter.

In addition to the foregoing, it is an object of my invention to provide improvements in the central structure and control of sustaining rotors.

A further object is to provide a novel form of rotor hub and rotor control mechanism for rotating wing aircraft of different types, that is either power driven or autorotating.

A further object is to provide a rotor having blade feathering control apparatus capable of imparting special pitch change characteristics with backward and forward movement of the blades in a plane perpendicular to the axis of rotation.

A further object is to provide a light central and control structure for rotors which is simple, economical, and compact.

A further object is to provide a small diameter hollow hub rotatably mounted in small diameter bearings in which cyclical and non-cyclical lift control of a rotor blade are transmitted through the hollow hub and bearings from a lift change mechanism to the blade by means of the cyclical axial oscillation and the axial positioning of a single rod-like member.

A further object is to provide an improved linkage between the cyclical lift control member and the lift adjustment member operated by the pilot and the pitch change mechanism on the rotor hub which shall be simple, effective, and rugged.

How the foregoing and other objects and advantages are secured will appear from the following description referring to the accompanying drawings which illustrate an embodiment of the invention applicable to a single sustaining rotor.

In the drawings, in which similar characters of reference refer to similar parts in the several views:

Fig. 1 is a partial side elevation of an aircraft of either the helicopter or Autogiro type, embodying the present invention and showing the pilot controls and linkage between them and the rotor lift control mechanism;

Fig. 2 is a plan view of a rotor head embodying features of my invention. In this view a portion of one of the rotor blade roots is shown in longitudinal section, better to illustrate the interior construction;

Fig. 3 is a vertical sectional view through the rotor hub shown in Fig. 4, showing the blade control linkage and the driving gear; and Fig. 4 is a fractional sectional view of a modification adapted to be substituted for a portion of the apparatus shown in Fig. 3.

Directly in front of the seat 52, a control stick 54 is positioned and by mechanism to be described presently, this stick is used by the operator to control a rotating wing 56.

A second control member which comprises a lever 58 is positioned alongside the seat 52 and is used by the operator to change the angle of attack of all the rotor blades simultaneously to increase or decrease the lift. The control stick 54 is used by the operator for pitching and rolling control and may also provide yaw control.

The fuselage 34 is provided with a rotor mast 60 which extends upwardly in a vertical direction above and slightly forward of the center of gravity of the aircraft. This mast carries a rotatably mounted rotor hub 62 at its upper end and this hub in turn is equipped with blades 64.

Referring to Figs. 2 and 3 which show the rotor head 62 in greater detail, it will be seen that this head carries three articulated blades 64 and is mounted to rotate freely relatively to the fuselage 34. As seen in Fig. 3, a tubular member indicated by the numeral 82 is secured to the fuselage 34 in Fig. 1 and serves to transmit the lift from the rotor to the aircraft 12. The member 82 may be formed as a machined forging and carries radial thrust anti-friction bearings 84 at its upper end and a second set of similar anti-friction bearings 86 at its lower end. The bearings 84 and 86 fit within recesses in the ends of the tubular member 82 and the upper of these bearings 84 is secured in its seat by an annular threaded cap 88. The inner races of the bearings 84 and 86 carry a tube 90, the upper end of which is secured to a forged head 92. The lower end of this head rests against the end of the inner bearing race of the upper bearing 84 and transfers the weight of the rotating wing to this inner race. Beneath the lower bearing 86 a gear 94 is secured to the tube 90 and bears against the inner race of the bearing 86 and transmits the lift to this bearing member when the aircraft is in flight.

At one side, the tubular member 82 is formed to provide a bracket 96 which at its ends provides bearings 98 for the shaft 78 which is the shaft for transmitting power from the engine 16 to the rotor. This shaft 78 carries a gear 100 meshed with the gear 94 by means of which the tubular member 90 is rotated from the shaft 78. Preferably the shaft 78 should include a suitable overrunning clutch, such as the cam and roller type clutch 101, so that power can be applied to the rotor in only one direction, thus permitting free wheeling of the rotor in the event of a power failure. No detailed description of this clutch 101 is necessary since overrunning clutches are well known.

The rotor head 92 is formed at its upper end to provide three equally spaced radial ears 102 which carry horizontal hinge pins 104 to which in turn the yokes 106 are pivoted. Each of these yokes is formed integrally with a second yoke 108 which carries a vertical hinge pin 110 to which is pivoted the inner end of a spindle 112. Thus the spindle can move vertically about the hinge pin 104 and can move horizontally about the hinge pin 110. In order to limit the horizontal motion of the spindle 112 about the vertical pin 110, resiliently faced stops 114 are formed integrally with this spindle and impinge against co-operating stop members 116 formed integrally with the yoke 108. Each of the spindles 112 journals the root end of a blade 64 upon an anti-friction bearing set 118. This bearing set 118 is made up of two inner bearing members placed back to back which carry the thrust developed by the centrifugal force of the rotating blades, while an outer bearing member 118 locates the blades and opposes forces in the opposite direction.

The above described mounting of the rotor blades, it will be appreciated, permits movement of these blades in any direction. That is, they can move upwardly or downwardly, they can move from side to side, or they can rotate about their longitudinal axes.

Each of these blades is provided at its root with a pair of outwardly extending ears 120 positioned ahead of the leading edge. As shown in Fig. 2, each set of these ears carries a vertically mounted hinge pin 122. It must be appreciated, however, that although this pin is shown as vertical in this view, the actual position of the pin will depend upon the angle of attack of the blades 64, since these pins move with the blade. These pins in turn serve to pivot control arms 124 which extend somewhat downwardly and generally tangentially to a circle about the center of rotation of the hub 92.

At their other ends, each of these control arms is connected by means of a ball and socket joint 126 or other universal joint to an inwardly and downwardly extending arm 128, the opposite end of which is connected by means of a hinge pin 130 to a rocker arm 132 which extends through a slot in the hub 92. The hinge pin 130 is shown as inclined so that its lower end is closer to the center of rotation of the hub than its upper end, while the rocker arm 132 is pivoted at approximately its midpoint about a horizontal hinge pin 134 secured to the head 92. These hinge pins are so located that the rocker arms 132 extend radially outwardly from the hub at a point approximately midway between adjacent blades 64, while the linkage arrangement is such that each of the rocker arms 132 is connected to the next rearwardly adjacent blade 64 with reference to the direction of rotation of the hub 92.

With the pin 130 sloping outwardly and upwardly, as shown in the drawing, and with the longitudinal axis of the blade 64 occupying a radial position passing through the axis of rotation, the angle of the blade 64 will decrease by rotation around the bearing set 118 when the blade swings backwardly through a small angle and will increase again when the blade swings backwardly through a larger angle.

When the blade swings forwardly around the pin 118 from a radial position, the angle of the blade will also increase by rotation around the bearing set 118. This is because the arm 128 is located ahead of the radial position, that is, ahead of a radius drawn through the axis of rotation and through the axis of the pin 130 when the longitudinal axis of the blade 64 occupies a radial position. The ball joint 126 at the end of the arm 128 will rise as the arm 128 swings to either side of its radial position. The position of the arm 128 relative to the radial position of the longitudinal axis of the blade 64 may be established by properly selecting the length of the arm 124. The characteristics provided by the arrangement shown in Figs. 2 and 3 will increase the angle of attack of the blade when the blade swings forwardly of its radial position and will decrease its angle of attack when it swings backwardly relative to its radial position through a moderate angle. This effect may be employed to increase the drag of the blade if it is displaced forwardly and to decrease the drag of the blade if it is displaced rearwardly, thus tending aerodynamically to stabilize the blade and maintain it close to its radial position. However, when torque is applied to the hub to drive the blades as in a helicopter, the blades will tend to swing backwardly sufficiently far to displace the arm 128 to the rear of its radial position. This will increase the angle of attack of the blade and will cause it to absorb the greater torque without a substantial increase in the rotational speed.

Also, if the power applied to the hub is suddenly interrupted, as for instance by the stoppage of the motor, the blades 64 would swing forwardly to the radial position, at which point their angle of attack may be such as to provide good autorotational characteristics. Thus, the rotational speed of the rotor and its lift would automatically be preserved. It will thus be seen that the application of power automatically increases the blade angle to that desired for helicopter operation, while the interruption of the power drive automatically causes the angle of attack to change to an angle of around 4°, suitable for autorotational flight.

It should be understood that the rocker arm 132 and the arm 128 may be so constructed as to give any desired angle in any desired plane of the pin 130, thus securing a desired relation to give a proper change in the angle of the blade around the bearing set 118 with a given swing of the blade forwardly or backwardly around the pin 110.

Further variations may also be produced by changing the relation between the radial position of the arm 128 and the radial position of the blade 64.

It should here be pointed out that the angle of the pin 130 changes with the movement of the rocker arm 132 around its axis 134, the latter resulting from control displacements. When the outer end of the arm 132 is in its lowermost position, the angle of the pin 130 will be largest relative to the axis of rotation. Thus, in this position, a greater change of angle of the blade 64 around the bearing set 118 will occur with a given swing of the blade forwardly or backwardly around the pin 110 than when the outer end of the pin 132 is in its uppermost position and the angle of the pin 130 relative to the axis of rotation is correspondingly smaller. This change effected by control displacement may have advantages when particular control effects are desired.

In Fig. 4 a modification is shown wherein because of the parallelogram arrangement there provided by the arms 132 and 132' and the link 133, the angle of the pin 130 changes very little with control displacements. This arrangement may be preferable when certain other control characteristics are desired. In Fig. 4, parts corresponding to similar parts in Fig. 3 are given corresponding numbers.

It should also be understood that the axis of the pin 130 in the embodiment of either Fig. 3 or Fig. 4 may be made approximately parallel to the axis of rotation when little or no change of blade angle with forward or backward swinging movements around the pin 110 is desired. The angle of the pin 130 may also be given a forward or backward inclination relative to the direction of rotation of the hub. Thus, other characteristics advantageous for certain purposes may be imparted to the rotor. From the above it will be appreciated that this invention is directed more specifically to the particular means of securing any desired characteristics through an inclination of a joint between the control mechanism and the feathering blade than toward the selection of a particular characteristic, since the particular characteristics desired in any particular aircraft are largely influenced by other features incorporated in the aircraft and by the type of service for which it is intended.

The inner end of each of the rocker arms 132 is connected by a horizontal hinge pin 136 to the upper end of a vertically extending control rod 138, the lower end of which is attached to an L-shaped bracket 140. These brackets extend outwardly through slots 142 in the side walls of the tube 90 and thence downwardly where their lower ends are pivoted to horizontal pins 143 positioned tangential to a circle about the center of rotation of the rotor head. The pins 143 in turn pivot in blocks 144 secured to the outer ends of radially extending pins 146 which at their inner ends are secured in an inverted cup-shaped member 148. At its inner end one of these pins 146, which is somewhat longer than the other three, extends into a recess 152 in the cup 148 and is journaled through the edge of an annular ring-like member 154, while in alignment with this long pin 146, a short pin 156 similarly extends from the cup 148 into the ring 154, so that the ring is journaled to pivot about these two pins. This ring in turn has a transverse pin 158 located at right angles to the center line of the long pin 146 and the short pin 156. The transverse pin 158 in turn passes through and is journaled in a downward extension 160 formed integrally with a sleeve 162 which telescopes around the lower portion of the tube 90. This sleeve 162 is free to move upwardly and downwardly over the surface of the tube 90 but is prevented from rotating relative to the tube by pins 164 which extend through the side walls of the sleeve 162 into vertically extending slots 166 cut in the tube 90.

The cup 148 is provided with a downwardly depending control lever 168 about which the cup 148 can revolve on anti-friction bearings 170 although no other relative movement between the lever 168 and the cup 148 can take place.

Referring to Fig. 3, it will be seen that if the lower end of the control lever 168 is moved toward the right, as shown in the figure, the cup 148 will be pivoted about the pin 158 so as to raise the lower end of the L-shaped arm 140 shown in this figure. As this L-shaped arm is raised, it in turn raises the right hand control rod 138 and rocks the outward end of the rocker arm 132 that shows in this figure downwardly. This in turn causes the general downward movement of the arm 128, the arm 124, and therefore the leading edge of the wing 64 to which the arm 124 is pivoted. Simultaneously, the opposite side of the cup 148 will be rocked downwardly and thus the other two control rods 138, only one of which shows in this figure, will be moved downwardly a somewhat smaller distance than the right hand rod 138 is moved upwardly since their point of connection to the cup 148 is not as far from the pivoting axis around the pin 158 as is the similar connection between this cup and the right hand rod 138. The effect of this will be to cause an increase in the angle of attack of the other two blades 64.

Now as the rotor head rotates, it will carry with it the tube 90, the rods 138, the L-shaped members 140 and the cup 148. Thus if the control lever 168 is held to the right, for instance, as viewed in Fig. 5, the effect upon the rotor will be to cause each arm 128 progressively to move downward and to decrease the angle of attack of its blade as is moves toward the position in which the lower end of the lever 168 is held and to progressively move upward the arm 128 and increase the angle of attack of its blade as it moves away from this position. Therefore, if the lower end of the lever 168 is moved toward the rear of the aircraft, the arms 128 will be lowered as they approach the rear of the aircraft and will be raised as they approach the front of the aircraft, thus causing the nose of the aircraft to rise, thereby putting the aircraft into a climbing attitude. Similarly, forcing the lower end of the lever 168 forwardly causes the airplane to go into a diving attitude, while moving the lower end of this lever toward the right causes the aircraft to roll to the right, while a similar movement of the stick to the left will cause the aircraft to roll toward the left. Of course, any position assumed by the lever which combines movement about two of these axes, such as movement of the lever toward the rear and toward the left will cause the aircraft to seek an attitude which is a combination of these two effects. For instance, with the lever in the above position, the aircraft would seek a climbing attitude and would roll toward the left. It may be here pointed out that as each rocker arm 132 is positioned centrally between two blades 64 and is operatively connected to the rearwardly adjacent blade, the arm 132 leads the blade 64 to which it is connected through the arm 128 and the arm 124 by 60°. Thus, the control forces applied to the arm 132 will lead the change of angle of the blade 64 resulting from a control displacement by 60°. Generally speaking, the change in angle of the blade 64 resulting from a control displacement may occur 90° in advance of the position at which the blade 64 flaps upwardly or downwardly to the greatest extent.

However, this angle of control advance may be varied to a considerable extent, depending upon the characteristics desired. The angle of control advance of 60° shown in the accompanying figures is a practical arrangement which may be used for purposes of illustration, although it will be understood that different angles of advance within a practical range may be employed, if desired.

If the lever 168 is pushed straight upwardly, all of the control rods 138 will be raised an equal amount and the angle of attack of all of the blades 164 will be decreased the same amount. Thus, the lift of the rotor is decreased. Conversely, downward movement of the lever 168 will cause the angle of attack of the blades to increase and will increase the lift of the rotor.

Referring to Fig. 1, it will be seen that the lower end of the lever 168 is connected to a longitudinally extending sliding and rocking member 170 which at its forward end is pivotally connected to the control stick 54. The sliding and rocking member 170 slides upon and rocks about a cylindrical rod 172 which has its forward end mounted to pivot in a bracket 174 attached to the aircraft fuselage so that the rearward end of the rod 172 can be raised. This rod near its rearward end is provided with a sliding block 176 pivotally connected to an offset extension of the control lever 58 so that when the control lever 58 is pushed forwardly, the rearward end of the rod 172 will be raised while when the control lever 58 is moved backwardly the rearward end of this rod will be lowered.

It will be understood that the rear end of the rod 172 may be biased toward a neutral position by means of springs attached thereto so that if the lever 58 is released, the springs will bias the rod 172 to a position corresponding to a mean angle of incidence of all the blades 64 suitable for auto-rotation; for instance, a positive angle of about 4° relative to a plane perpendicular to the axis of rotation of the rotor. A notched sector may also be provided for the lever 58 whereby engaging a detent on the lever with any desired notch in the sector will hold the lever 58 securely in any desired position.

Since the rocking and sliding member 170 is connected at one end to the control stick 54 and at its opposite end to the control lever 168, it will be seen that when the upper end of the stick 54 is pulled rearwardly, the lower end of the lever 168 will be moved rearwardly. Similarly, forward or side-to-side movement of the upper end of the control stick 54 brings about similar forward or side-to-side movement of the lower end of the control lever 168. Thus it will be seen that movement of the control stick 54 controls the rotor 56 so that the attitude assumed by the aircraft is similar to that assumed by a conventional airplane upon similar control stick movements. It will also be seen that movement of the lever 58 forwardly causes substantially straight upward movement of the control lever 168, thus decreasing simultaneously the angle of attack of all the rotor blades, while rearward movement of the control lever 58 increases the angle of attack of all of the blades simultaneously.

In the specification, I have explained the principles of my invention and the best mode in which I have contemplated applying those principles, so as to distinguish my invention from other inventions; and I have particularly pointed out and distinctly claimed the part, improvement or combination which I claim as my invention or discovery.

While I have shown and described certain preferred embodiments of my invention, it will be understood that modifications and changes may be made without departing from the spirit and scope thereof, as will be clear to those skilled in the art.

What I claim as new and useful and desire to secure by Letters Patent of the United States is:

1. In a lifting rotor having a hub rotating about an axis of rotation and a blade revolving therewith, means connecting said blade to said hub to permit swinging motion of said blade in a plane containing said axis of rotation and in a plane perpendicular thereto, bearing means about which said blade may rotate on its longitudinal axis to vary the angle of incidence of said blade, connecting means carried by said blade, linkage means including a joint having an axis permanently inclined relative to said rotational axis between said connecting means and said hub, said linkage means being constructed and arranged so as to produce a desired change in the angle of incidence of said blade with a given swinging motion of said blade in a plane perpendicular to said rotational axis.

2. In a lifting rotor having a hub rotating about an axis of rotation and a blade revolving therewith, means connecting said blade to said hub to permit swinging motion of said blade in a plane containing said axis of rotation and in a plane perpendicular thereto, bearing means about which said blade may rotate on its longitudinal axis to vary the angle of incidence of said blade, connecting means carried by said blade, manually operable control means carried by said hub and movable relative thereto, linkage means connected between said connecting means and said control means, said linkage means including a movable joint having an axis permanently inclined relative to said rotational axis so as to produce a change in the angle of incidence of said blade when said blade swings backward or forward in a plane perpendicular to said rotational axis, said change of angle of incidence depending upon the particular inclination of the axis of said joint relative to said rotational axis.

3. In a lifting rotor having a hub and a blade carried thereby, means connecting said blade to said hub so as to permit the rotation of said blade around its longitudinal axis to vary the angle of incidence of said blade, a rocker arm pivoted to said hub with its outer end projecting outwardly from its pivot and its inner end projecting inwardly from its pivot to a point close to the axis of said hub, a second rocker arm pivoted to said hub and projecting outwardly from its pivot, a tie member connecting the outer ends of the first and second rocker arms, linkage means connecting said tie member to said blade, a connecting member connected to the inner end of first said rocker arm and projecting downwardly through said hub, and manually operable means below said hub adapted to move said connecting member axially upward or downward relative to said hub to vary the angle of incidence of said blade.

4. In a lifting rotor having a hollow hub and a blade carried thereby, means connecting said blade to said hub so as to permit the rotation of said blade around its longitudinal axis to vary the angle of incidence of said blade, a rocker arm pivoted to said hub with its outer end projecting outwardly from its pivot and its inner end projecting inwardly from its pivot to a point close to the axis of said hub, linkage means connecting the outer end of said rocker arm to said blade, a universally tiltable member positioned below said hub, an axially slidable member mounted on the lower end of said hub and rotating therewith, universal joint means connecting said axially slidable member with said tiltable member, a connecting member passing through the hollow interior of said hub and connecting said tiltable member with the inner end of said rocker arm, and manually operable means for raising or lowering said axially slidable member to increase or decrease the angle of incidence of said blade and for imparting any desired tilt to said tiltable member to periodically change the angle of incidence of said blade relative to the angle established by the movement of said axially slidable member as said hub revolves.

5. In a lifting rotor having a hollow hub and a blade carried thereby, means connecting said blade to said hub so as to permit the rotation of said blade around its longitudinal axis to vary the angle of incidence of said blade, a rocker arm pivoted to said hub with its outer end projecting outwardly from its pivot and its inner end projecting inwardly from its pivot to a point close to the axis of said hub, linkage means connecting the outer end of said rocker arm to said blade, a universally tiltable member positioned below said hub and connected to the lower end of said hub by universal joint means coaxial with said hub, a connecting member passing through said hub and connecting the inwardly projecting end of said rocker arm to said tiltable member, and manually operable means for imparting any desired tilt to said tiltable member to periodically change the angle of incidence of said blade as said hub revolves.

6. In a lifting rotor having a hub and a blade carried thereby, means connecting said blade to said hub to permit swinging motion of said blade in a plane perpendicular to the axis of rotation and to permit the rotation of said blade around its longitudinal axis to vary its angle of incidence, a rocker arm pivoted to said hub with its outer end projecting outwardly from its pivot and its inner end projecting inwardly from its pivot to a point close to the axis of said hub, a second rocker arm pivoted to said hub and projecting outwardly from its pivot, a tie member connecting the outer end of the first rocker arm to the outer end of the second rocker arm, a bearing carried by said tie member having its axis inclined to the axis of rotation of said rotor, an arm carried by said bearing and swingable about the inclined axis of said bearing, linkage means connecting said arm to said blade, a connecting member connected to the inner end of first said rocker arm and projecting outwardly through said hub, and manually operable means for moving said connecting member axially upward or downward to vary the angle of incidence of said blade.

7. In a lifting rotor, a hollow hub, a blade revolving with said hub, means connecting said blade to said hub so as to permit rotation of said blade around its longitudinal axis to vary its angle of incidence, means rotating with said hub and mounted thereon for movement in the axial direction of the hub, linkage means including a member pivotally secured to and rotating with the hub and extending from within to without said hub connecting said last mentioned means to said blade, a universally tiltable control member supported by and rotatable with said hub, means connecting said tiltable member with the means mounted on and movable axially of the hub, and means for tilting said tiltable member whereby the angle of incidence of said blade is cyclically changed as the hub and blade rotate.

8. In a rotary wing system, a lift control means including a lift control surface movable about an axis, for lift variation, and a lift control surface supporting hub means hingedly supporting said lift control surface on said hub, two arms pivotally mounted on said hub, a link member pivotally connected to the outer end of each arm, means carried by said link member establishing a pivotal axis, linkage means connected at one end to said lift control surface and pivotally connected at the other end to said link member for movement around said pivotal axis, and manually controllable means for moving said arms, connecting member, and lift control surface to vary the lift while maintaining the direction of said pivotal axis substantially unchanged.

9. A rotating wing having a blade angularly movable about its major axis for blade pitch variation and about vertical and horizontal axes, including in combination, means including a rotatable hub for movably supporting said blade, a pair of arms mounted on said hub for pivotal movement about vertically spaced apart aligned axes, a link member pivotally connected to the outer ends of said arms and having a length such that the arms are substantially parallel to each other, means supported by said link member constituting a pivotal axis inclined vertically in a plane passing through the axis of rotation of the blade, linkage means movably connected at one end to the blade and pivotally movable about said inclined axis at its opposite end, and means for pivotally moving said arms thereby to vary the pitch of said blade.

10. In a lifting rotor having a hub rotatable about a generally vertical axis and a blade revolving therewith, including in combination, means supporting said blade upon said hub to permit swinging motion of the blade about horizontal and vertical axes, means rotatably supporting said blade for movement about its longitudinal axis for variation of the angle of incidence of said blade, and means for changing the angle of incidence of said blade when said blade moves about the axis parallel to the axis of rotation, said last mentiontd means including a joint having an axis inclined vertically in a plane passing through the axis of rotation of the hub, and linkage means connected to the blades and pivotally movable about said axis.

11. In a lifting rotor having a hub rotatable about a generally vertical axis of rotation and at least one blade revolving therewith, means supporting said blade from said hub for swinging motion of the blade about a vertical supporting axis and for rotational movement about the longitudinal axis of the blade to vary its angle of incidence, controllable linkage means connecting said blade to said hub for cyclically varying the angle of incidence of said blade, said linkage means including structure defining a single linkage axis inclined relative to said vertical supporting axis and linkage means connected to said blade pivoting about said single linkage axis, whereby the swinging of said blade around its vertical supporting axis produces a predetermined change in the angle of incidence of said blade depending on the angle of said linkage axis relative to said supporting axis.

12. A control for a lifting rotor of the type having a vertically movable and universally tiltable control member, including in combination, a generally vertically disposed actuating lever rotatably journaled to said control member, a longitudinally extending sliding and rocking member connected to said actuating lever, a supporting member supporting said sliding and rocking member for sliding and rocking movement, means including a pivotal connection for the remote end of said supporting member and a pivotally supported control lever having a sliding connection with said supporting member for effecting vertical movement of the other end of the supporting member and thereby of said actuating lever, a manual control member pivotally connected to the remote end of said supporting member and also pivotally connected to the corresponding end of said sliding and rocking member for effecting tilting movement of said actuating lever.

13. In a rotating wing, a hollow hub, at least one blade secured to said hub by pivotal connecting means permitting flapping of said blade in a plurality of planes and blade pitch change about a spanwise axis, means connected to said blade outside said pivotal connecting means to vary its pitch, at least one rod extending through the hollow interior of said hub and rotatable therewith, a rocker arm extending through the wall of said hub, bearing means defining an axis generally tangent to a circle concentric with said hub, said rocker arm being secured, intermediate its ends, by said bearing means to said hub for angular movement about said axis, means operably connecting the top of said rod to the inner end of said rocker arm, means operably connecting said pitch varying means to the outer end of said rocker arm, an axially movable and tiltable pitch change mechanism, means operably connecting the bottom of said rod to said pitch change mechanism to axially position said rod to cause pitch adjustment, and to axially oscillate said rod in timed relation with wing rotation to cause cyclic pitch variation when said wing rotates, in response to axial movement and tilt of said pitch change mechanism respectively, bearing means surrounding and mounting said hub for rotation, positioned below said blade pitch control means and above said pitch change mechanism, and control means connected to said pitch change mechanism for axially moving and tilting said mechanism while permitting relative rotation.

14. In a rotating wing, a hollow hub, mounting means therefor, at least one variable lift blade mounted on said hub, means associated with said blade to control its lift, at least one rod extending through the hollow interior of said hub and rotatable therewith, means operably connecting said lift control means to the top of said rod, a member mounted on the bottom of said hub below the mounting means for rotation therewith and for axial movement relative thereto, a tiltable mechanism, rotating with said member and said hub universal joint means rotating bodily with said member and said hub and directly connecting said tiltable mechanism to said axially movable member, and supporting said tiltable mechanism directly from said axially movable member means operably connecting the bottom of said rod to said tiltable mechanism to axially position said rod to cause lift adjustment, and to axially oscillate said rod in timed relation with wing rotation to cause cyclic lift variation when said wing rotates, in response to axial movement of said member and tilt of said tiltable mechanism respectively, said mounting means including bearing means surrounding and mounting said hub for rotation, positioned below said blade lift control means and above said axially movable member, and control means for axially moving said member and tilting said mechanism while permitting relative rotation.

15. In a rotating wing, a hollow hub, at least one variable lift blade mounted on said hub, means associated with said blade to control its lift, at least one rod extending through the hollow interior of said hub and rotatable therewith, a rocker arm extending through the wall of said hub, bearing means defining an axis generally tangent to a circle concentric with said hub, said rocker arm being secured, intermediate its ends, by said bearing means to said hub for angular movement about said axis, means operably connecting the top of said rod to the inner end of said rocker arm, means operably connecting said lift control means to the outer end of said rocker arm, an axially movable and tiltable lift change mechanism, means operably connecting the bottom of said rod to said lift change mechanism to axially position said rod to cause lift adjustment, and to axially oscillate said rod in timed relation with wing rotation to cause cyclic lift variation when said wing rotates, in response to axial movement and tilt of said lift change mechanism respectively, bearing means surrounding and mounting said hub for rotation, positioned below said blade lift control means and above said lift change mechanism, and control means connected to said lift change mechanism for axially moving and tilting said mechanism while permitting relative rotation.

16. In a rotating wing, a hollow hub, at least one variable lift blade mounted on said hub, means associated with said blade to control its lift, at least one rod extending through the hollow interior of said hub near the rotational axis thereof and rotatable with said hub, means operably connecting said lift control means to the top of said rod, an axially movable and tiltable lift change mechanism, means operably connecting the bottom of said rod to said lift change mechanism to axially position said rod to cause lift adjustment, and to axially oscillate said rod in timed relation with wing rotation to cause cyclic lift variation when said wing rotates, in response to axial movement and tilt of said lift change mechanism respectively, axially spaced anti-friction bearing means surrounding and mounting said hub for rotation positioned below said blade lift control means and above said lift change mechanism, said bearing means having an internal diameter smaller than the external diameter of said lift change mechanism, and control means connected to said lift change mechanism for axially moving and tilting said mechanism while permitting relative rotation.

17. In a rotating wing, a small diameter hollow hub, at least one variable lift blade mounted on said hub, means associated with said blade to control its lift, small diameter bearing means surrounding and mounting said hub for rotation, an axially movable and tiltable lift change mechanism, larger in diameter that the inner diameter of said bearing means, positioned at the bottom of said hub below said bearing means, at least one rod rotating with said hub and extending through the hollow interior of said hub and through the bearing means, the top of said rod being connected to said lift control means, and the bottom of said rod being connected to the lift change mechanism to axially position said rod to cause lift adjustment, and to axially oscillate said rod in timed relation with wing rotation to cause cyclic lift variation when said wing rotates, in response to axial movement and tilt of said lift change mechanism, respectively, said rod being close to the hub axis, and the space within the bearing means through which the rod passes being free from bulky lift change elements, thus permitting small diameter, light hub and bearing means, and control means connected to said lift change mechanism for axially moving and tilting said mechanism while permitting relative rotation.

18. In a lifting rotor, in combination, a hollow hub, a blade revolving with said hub, axially spaced bearing means surrounding and mounting said hub for rotation, an axially movable connecting member for the blade, rotatable therewith, positioned closely adjacent the axis of rotation of and inside said hub, and extending through the interior of said bearing means, linkage means mounted on said hub above and extending radially beyond said bearing means, and having one end connected to said blade for varying the effective pitch thereof, and having the other end connected to the upper end of said connecting member, a tiltable member mounted for rotation with said hub below said bearing means, the lower end of said connecting member being connected to said tiltable member, the hollow interior of said hub being smaller in diameter where it passes through said bearing means than the diameter of said linkage means and of said tiltable member, said axially movable connecting member being axially oscillated in timed relation with rotor rotation by the connection to said tiltable member when tilted, during rotation of said rotor, to cause cyclic variations in effective pitch.

19. A control for a lifting rotor of the type employing axial movement for lift adjustment and universal tilting for cyclical lift control, including in combination, axially movable and tiltable lift control means associated with said rotor, a longitudinally extending sliding and rocking member connected to said lift control means, a supporting member mounting said sliding and rocking member for sliding and rocking movement, means including a pivotal connection near the end of the supporting member remote from said lift control means, a pivotally supported lift adjustment lever having a movable connection with said supporting member for effecting lift adjusting movement of the end of said supporting member opposite the pivotal connection, a control member pivotally connected to the remote end of said sliding and rocking member and also pivotally connected to a point stationary relative to the sliding motion of said sliding and rocking member for tilting said lift control means in a plurality of planes to effect cyclical lift control of said rotor.

EDWARD F. ANDREWS.

REFERENCES CITED

The following references are of record in the file of this patent:

UNITED STATES PATENTS

| Number | Name | Date |
| --- | --- | --- |
| 1,344,661 | Strong | June 29, 1920 |
| 1,546,443 | Glessner | July 21, 1925 |
| 1,613,842 | Mummert | Jan. 11, 1927 |
| 1,650,346 | Hall | Nov. 22, 1927 |
| 1,879,323 | Koch | Sept. 27, 1932 |
| 1,919,089 | Breguet et al. | July 18, 1933 |
| 1,921,805 | Bordoni | Aug. 8, 1933 |
| 1,986,709 | Breguet et al. | Jan. 1, 1935 |
| 2,088,413 | Hafner | July 27, 1937 |
| 2,225,002 | Focke | Dec. 17, 1940 |
| 2,256,635 | Young | Sept. 23, 1941 |
| 2,317,340 | Bennett | Apr. 27, 1943 |
| 2,318,259 | Sikorsky | May 4, 1943 |
| 2,321,572 | Campbell | June 15, 1943 |
| 2,337,570 | Pullin | Dec. 28, 1943 |
| 2,338,935 | Hafner | Jan. 11, 1944 |
| 2,352,342 | Pitcairn | June 27, 1944 |
| 2,369,652 | Avery | Feb. 20, 1945 |